US012728708B2

(12) United States Patent
Yates

(10) Patent No.: US 12,728,708 B2
(45) Date of Patent: Sep. 8, 2026

(54) VEHICLE

(71) Applicant: MCMURTRY AUTOMOTIVE LIMITED, Wotton-Under-Edge (GB)

(72) Inventor: Thomas Yates, Wotton-under-Edge (GB)

( * ) Notice: Subject to any disclaimer, the term of this patent is extended or adjusted under 35 U.S.C. 154(b) by 355 days.

(21) Appl. No.: 18/549,618

(22) PCT Filed: Mar. 9, 2022

(86) PCT No.: PCT/EP2022/055985
§ 371 (c)(1),
(2) Date: Sep. 8, 2023

(87) PCT Pub. No.: WO2022/189483
PCT Pub. Date: Sep. 15, 2022

(65) Prior Publication Data
US 2024/0157770 A1 May 16, 2024

(30) Foreign Application Priority Data
Mar. 11, 2021 (GB) ..................................... 2103358

(51) Int. Cl.
*B60J 5/04* (2006.01)
*B60N 2/01* (2006.01)
(Continued)

(52) U.S. Cl.
CPC .............. *B60J 5/0473* (2013.01); *B60N 2/01* (2013.01); *B60R 21/21* (2013.01); *B62D 25/04* (2013.01);
(Continued)

(58) Field of Classification Search
CPC ... B60J 5/04; B60J 5/047; B60J 5/0472; B60J 5/0473; B60J 21/017; B60J 21/21;
(Continued)

(56) References Cited

U.S. PATENT DOCUMENTS 5,992,918 A * 11/1999 Gobart .................. B60J 5/0473 296/146.13
6,416,093 B1 * 7/2002 Schneider ............ B60R 19/205 293/118
(Continued)

FOREIGN PATENT DOCUMENTS

CN 208702291 U * 4/2019
DE 102016218146 A1 3/2018
(Continued)

OTHER PUBLICATIONS

Computer translation of DE 102016218146 (Year: 2016).*
(Continued)

*Primary Examiner* — Gregory A Blankenship
(74) *Attorney, Agent, or Firm* — Egbert, McDaniel & Swartz, PLLC

(57) ABSTRACT

Disclosed is a vehicle with a body having a cockpit therein, wherein: the cockpit contains one or more seats disposed in a single file arrangement; the body has first and second doors for accessing the cockpit, the first and second doors being arranged on opposite sides of the cockpit; when the first door is closed, an upper portion of the first door is arranged to form a first part of a roof of the cockpit; and the first part of the roof of the cockpit is larger than any part of the roof of the cockpit formed by the second door when the second door is closed. By providing two doors which are asymmetrical, it is possible to reduce a size of the cockpit without compromising accessibility or safety of the vehicle. Reducing a size of the cockpit may contribute to reducing an overall mass and size of the vehicle.

20 Claims, 7 Drawing Sheets

(51) Int. Cl.

| | |
|---|---|
| ***B60R 21/21*** | (2011.01) |
| ***B62D 25/04*** | (2006.01) |
| ***B62D 25/06*** | (2006.01) |
| ***B62D 31/00*** | (2006.01) |
| ***B62D 35/00*** | (2006.01) |
| ***E05D 11/00*** | (2006.01) |

(52) U.S. Cl.
CPC .......... *B62D 25/06* (2013.01); *B62D 31/003* (2013.01); *B62D 35/00* (2013.01); *E05D 11/00* (2013.01); *E05Y 2900/531* (2013.01)

(58) Field of Classification Search
CPC ...................... B60J 2021/0086; B60J 5/0401; B60J 5/0402; B62D 25/06; B62D 35/00; B62D 35/008; B60R 21/017; B60R 21/21; B60R 2021/0086
See application file for complete search history.

(56) References Cited

U.S. PATENT DOCUMENTS

| | | | | |
|---|---|---|---|---|
| 9,045,025 | B1 | 6/2015 | Greene et al. | |
| 2006/0032683 | A1 | 2/2006 | Kejha | |
| 2006/0290169 | A1* | 12/2006 | Fukushima | B62D 35/007 296/180.1 |
| 2009/0184501 | A1* | 7/2009 | Hirotani | B60J 5/0452 280/730.2 |
| 2012/0212006 | A1* | 8/2012 | Coldre | B60J 5/0473 296/146.4 |
| 2015/0232132 | A1* | 8/2015 | Fischer | B60J 1/008 180/68.5 |
| 2018/0134317 | A1* | 5/2018 | Gerhardt | B60J 1/002 |
| 2018/0154745 | A1 | 6/2018 | Shin | |
| 2018/0171691 | A1 | 6/2018 | Yoo et al. | |
| 2018/0251014 | A1* | 9/2018 | Baccouche | B60J 5/0479 |
| 2019/0106075 | A1* | 4/2019 | Deng | B60R 21/23138 |
| 2019/0256037 | A1* | 8/2019 | Ghannam | B60R 21/0428 |
| 2023/0121910 | A1* | 4/2023 | Diephuis | B60J 5/0473 296/146.1 |
| 2023/0391171 | A1* | 12/2023 | Gitter | B60J 5/062 |
| 2024/0157770 | A1* | 5/2024 | Yates | B60N 2/01 |
| 2024/0326565 | A1* | 10/2024 | Crozier | B60J 5/0473 |

FOREIGN PATENT DOCUMENTS

| | | | | |
|---|---|---|---|---|
| EP | 0058599 | A1 * | 8/1982 | B60J 10/76 |
| EP | 3323698 | A1 | 5/2018 | |
| GB | 1020521 | A | 2/1966 | |
| JP | S59128014 | A | 7/1984 | |
| JP | S59199321 | A | 11/1984 | |
| JP | 3082629 | B2 * | 8/2000 | B60J 5/0479 |
| WO | 2016135691 | A2 | 9/2016 | |

OTHER PUBLICATIONS

Computer translation of CN 208702291 (Year: 2019).*
International Search Report for corresponding PCT/EP2022/055985 dated Jun. 13, 2022.
Written Opinion of the International Searching Authority for corresponding PCT/EP2022/055985 dated Jun. 13, 2022.
Written Opinion of the International Preliminary Examining Authority for corresponding PCT/EP2022/055985 dated Jun. 21, 2023.
Combined Search and Examination Report for GB Priority Application GB2103358.4, dated Jul. 21, 2021.

* cited by examiner 608
616
610
618
620
612
624
122
110
602
613

622
614
618
610
616
612
624
122
110
602
613
608

VEHICLE

FIELD OF THE INVENTION

The present invention relates to a vehicle having a cockpit and two doors for accessing the cockpit, where the two doors have different shapes.

BACKGROUND

In contrast to larger vehicles such as sports utility vehicles (SUVs), vehicles having smaller dimensions may be ideally suited to urban environments, and present a wide range of advantages. In particular, smaller vehicles may be better able to navigate the often narrower roads in city centres, and they may contribute to a reduction in road congestion due to their reduced dimensions.

A smaller vehicle may also be much more energy efficient than its larger counterparts to manufacture, operate and dispose of, due to its reduced mass and size, making it more environmentally sustainable. This may include reduced energy consumption by the vehicle during use, which may reduce emissions and lead to improvements in air quality in city centres. A reduced vehicle size may be particularly beneficial where the vehicle is an electric vehicle, as the reduced mass and size of the vehicle may improve the vehicle's driving range and thus reduce the frequency with which it needs to be charged. This may serve to alleviate demand for charging points in an urban area, as well as reduce a strain on the electricity supply grid.

SUMMARY OF THE INVENTION

The invention is concerned with a vehicle having a cockpit containing one or more seats that are in a single file arrangement, i.e. such that the cockpit may have a width corresponding to a single seat. The inventors have found that, when attempting to reduce the dimensions of such a vehicle, a major challenge is ensuring accessibility of the cockpit, without compromising safety of the vehicle. The present invention addresses this challenge by providing a vehicle having a cockpit containing a single file seat arrangement, where there is a first door and a second door for accessing the cockpit from opposite sides. The two doors are arranged asymmetrically about a centreline of the vehicle, and may have different shapes. The first door may be arranged as a main door of the vehicle, which is dimensioned to enable easy access to the cockpit. The second door may be arranged as an auxiliary door of the vehicle, which is intended for use in case of emergencies, e.g. it may be used to exit the vehicle in case of an emergency if the first door is blocked shut. As an example, the first door may be a large door (e.g. a gull-wing door) on one side of the cockpit to enable easy entering and exiting of the cockpit, whilst the second door may be a smaller door (e.g. a hatch) on another side of the cockpit. Accordingly, during everyday use, a user may enter and exit the cockpit via the first door, with the second door being used only in case of emergencies.

The inventors have found that, by providing two doors which are asymmetrical and designed for different purposes, it is possible to reduce a size of the cockpit without compromising accessibility or safety of the vehicle. In particular, providing two doors for accessing the cockpit in this manner may facilitate everyday entering and exiting of the cockpit (i.e. via the first door), whilst ensuring that an occupant of the vehicle can exit the vehicle in case of an emergency, even when one of the doors is blocked or inoperable. For example, where the vehicle has rolled onto its roof or one of its sides, such that one of the doors is blocked, the occupant may exit the vehicle via the other door.

A conventional vehicle will tend to have doors arranged symmetrically on either side of the cockpit, with the doors on either side being designed for everyday entering and exiting of the cockpit. This may limit the extent to which the width of the cockpit can be reduced, as the doors on either side of the cockpit must each meet minimum size requirements to enable comfortable entering and exiting of the vehicle. In contrast, in the vehicle of the invention, only the first door may be intended for everyday use. As the first and second doors are not arranged symmetrically, a size of the cockpit can be reduced whilst maintaining a sufficiently large first door to enable easy access to the cockpit. Thus, the size of the cockpit in the vehicle of the invention may be reduced compared conventional vehicles having symmetrical door arrangements, without compromising accessibility or safety of the vehicle.

Reducing a size of the cockpit may contribute to reducing an overall mass and size of the vehicle. This may also serve to improve an aerodynamic profile of the vehicle. As a result, an energy efficiency of the vehicle may be improved. Moreover, reducing the size of the cockpit may further serve to make more room available in the vehicle for other components of the vehicle. For example, by reducing a size of the cockpit, more space may be made available for components such as batteries or impact absorbing structures, without increasing an overall size of the vehicle. Reducing a size of the cockpit may also mean that the mass of the cockpit makes up a smaller proportion of the vehicle's total mass, such that a larger proportion of the vehicle's mass may be dedicated to other components of the vehicle.

Reducing the overall mass and size of the vehicle may also offer benefits in terms of pedestrian safety. The reduced mass may reduce the kinetic energy of the vehicle travelling at a given speed. This may reduce the vehicle's braking distance and increase the probability of the vehicle being able to stop before a potential collision with a pedestrian. Further, this may cause a severity of injuries caused by a collision between the vehicle of the present invention and a pedestrian to be reduced, compared to an equivalent collision with a conventional larger and heavier vehicle.

According to a first aspect of the invention, there is provided a vehicle comprising a body having a cockpit defined therein, wherein: the cockpit contains one or more seats disposed in a single file arrangement; the body comprises a first door and a second door for accessing the cockpit, the first door and the second door being arranged on opposite sides of the cockpit; when the first door is closed, an upper portion of the first door is arranged to form a first part of a roof of the cockpit; and the first part of the roof of the cockpit is larger than any part of the roof of the cockpit formed by the second door when the second door is closed.

The vehicle may be any suitable type of vehicle, such as a road car or race car. The vehicle may be an electric vehicle, a hybrid vehicle, a vehicle with an internal combustion engine, a fuel-cell-powered vehicle, or any other type of powered vehicle. In some cases, the vehicle may be a self-driving vehicle. The vehicle may have four wheels, e.g. two front wheels and two rear wheels; however, other numbers of wheels are also possible. The vehicle of the invention may include any safety features as required by safety regulations for road vehicles. For example, the vehicle may include headlights, taillights, indicator lights, mirrors, windscreen wipers, airbags and other safety features. The vehicle may have seat-belts (e.g. three-point seat-belts) for securing an occupant in each of the one or more seats.

The body of the vehicle may correspond to an outer structure or shell of the vehicle, which defines in part an outer surface of the vehicle. The body may be mounted to a chassis or frame of the vehicle, to which wheels of the vehicle are coupled. Alternatively, the vehicle may comprise a uni-body chassis or a monocoque chassis, in which case the body and the chassis may be formed as a single structure. The body may include sides, a roof, and a floor of the vehicle and serve to define the cockpit inside the vehicle.

The cockpit corresponds to a space defined within the body of the vehicle and in which the one or more seats are located. Additionally, various controls for the vehicle (e.g. steering wheel, accelerator pedal, brake pedal, dashboard, etc.) may be located in the cockpit. The cockpit may also be referred to as a driver compartment.

The seats are disposed in a single file arrangement. Thus, where the cockpit contains multiple seats (e.g. two or more seats), the seats are arranged one behind the other. In other words, the cockpit does not contain any seats arranged next to one another. Each of the one or more seats may thus be disposed at a different respective longitudinal position in the cockpit. In this manner a maximum width of the cockpit may correspond to a width of only a single one of the one or more seats. Providing the vehicle with a single file seat arrangement may enable the width of the vehicle to be minimised, which may improve an aerodynamic profile of the vehicle.

The maximum width of the cockpit may be arranged to accommodate a width of only a single one of the one or more seats. For instance, the maximum width of the cockpit may be greater than a width of one of the one or more seats, and less than twice the width of the one of the one or more seats. In some cases, the width of the cockpit may be less than 1.5 times the width of the one of the one of the seats. For example, the width of one of the one or more seats may be 700 mm, and the width of the cockpit may be no more than 1050 mm. Herein, the maximum width of the cockpit may correspond to a maximum distance between a left-hand side and a right-hand side of the cockpit. For example, the maximum width of the cockpit may correspond to a maximum distance between a left-hand sidewall and a right-hand sidewall of the cockpit.

Where the cockpit contains multiple seats (i.e. two or more seats), the seats may each have a same width.

Each of the one or more seats may be configured to receive a single occupant (e.g. an adult human).

In some embodiments, the cockpit may contain a single seat (i.e. only one seat). Thus, in some embodiments, the invention provides a vehicle comprising a body having a cockpit defined therein, wherein: the cockpit contains a single seat; the body comprises a first door and a second door for accessing the cockpit, the first door and the second door being arranged on opposite sides of the cockpit; when the first door is closed, an upper portion of the first door is arranged to form a first part of a roof of the cockpit; and the first part of the roof of the cockpit is larger than any part of the roof of the cockpit formed by the second door when the second door is closed.

Therefore, the cockpit may be designed to receive a single occupant (e.g. an adult human). The occupant may be a driver of the vehicle or, in the case of a self-driving vehicle, a passenger. Providing the vehicle with a single seat may serve to reduce a mass of the vehicle. Moreover, surveys have shown that for a majority of car journeys, only a single seat is needed. Accordingly, the vehicle of the invention avoids inefficiencies linked to the transporting of unoccupied seats that occur during a majority of car journeys. The seat may be any suitable vehicle seat, e.g. a car seat.

In other embodiments, the cockpit may contain a first seat, and a second seat located behind the first seat. Thus, the seats may be in a tandem arrangement. For example, the first seat may be arranged as a driver seat, and the second seat may be arranged as a passenger seat. Alternatively, both seats may be arranged as passenger seats, e.g. where the vehicle is a self-driving vehicle. The cockpit may contain further seats, located behind the second seat. For instance, the cockpit may contain a third seat located behind the second seat.

The first door and the second door form part of the body of the vehicle. The first door and the second door can each be opened and closed, i.e. they can each be movable between respective open and closed positions. For example, the first door and/or the second door may be movably connected to the body. The first and second doors are dimensioned so that a user (e.g. an adult human) may enter and/or exit the cockpit via each of the first and second doors. The first door and the second door may be arranged to cover a first opening and a second opening, respectively, in the body when they are in their closed positions. Then, when the first door and the second door are in their open positions, the first opening and the second opening may be exposed, respectively, so that a user can access the cockpit via the first and second openings.

The first and second doors of the invention may include any safety features as required by safety regulations for road vehicles. For example, the first and second doors may include windows, mirrors, cameras, side repeaters, latches, locks and other safety features.

When the first door and the second door are in their closed positions, the cockpit may form an enclosure around the one or more seats. Thus, when the first and second doors are closed, the cockpit may form an enclosed compartment within the vehicle, such that the cockpit is separated from an outside of the electric vehicle by the body of the vehicle. In other words, when the first and second doors are closed, the cockpit may not be accessible from outside the vehicle. Making the cockpit closable in this manner may improve a safety of the vehicle, as it may reduce a risk of injury to an occupant of the vehicle in case of a collision, as well as prevent a pedestrian from falling into the cockpit, e.g. in case of a collision with a pedestrian. Making the cockpit closable in this manner may also improve a comfort of the vehicle by providing protection from rain and wind to the occupant.

The first door and the second door are arranged on opposite sides of the cockpit. Thus, the first door and the second door are arranged on opposite sides of the one or more seats. This may enable a user to enter or exit the cockpit from either side of the vehicle. This may also facilitate exiting the vehicle in case of an accident, as the occupant may exit the cockpit even when one of the doors becomes blocked or inoperable. The opposite sides of the cockpit may correspond to a left-hand side of the cockpit and a right-hand side of the cockpit, e.g. where the left-hand side and right-hand side of the cockpit are defined with respect to an occupant of the one or more seats. So, for example, the first door may be on a left-hand side of the cockpit, whilst the second door may be on the right-hand side of the cockpit (or vice versa).

The first door is arranged such that, when it is closed (i.e. when it is in the closed position), an upper portion of the first door forms a first part of a roof of the cockpit. The roof of the cockpit may correspond to a part of the cockpit that is disposed over the one or more seats, i.e. it may be disposed over a head of an occupant of the one or more seats. Thus, when the first door is closed, the upper portion of the first door may be disposed over at least one of the one of the one or more seats. The roof of the cockpit may be defined by a roof of the body of the vehicle, such that the upper portion of the first door corresponds to a first part of the roof of the body when the first door is closed. The first door may further comprise a lower portion, which is arranged to form part of a side of the cockpit (e.g. a sidewall of the cockpit) when the first door is closed. At least part of a surface of the roof of the cockpit may be substantially horizontal. As a result, when the first door is closed, at least part of a surface of the upper portion of the first door may be substantially horizontal.

The first part of the roof of the cockpit (which is formed by the upper portion of the first door when it is closed) is larger than any part of the roof of the cockpit formed by the second door when the second door is closed. In other words, the first door is arranged to form a larger part of the roof than the second door. Thus, if the second door includes a portion which forms a second part of the roof of the cockpit when the second door is closed, the first part of the roof is larger than the second part of the roof (however, as discussed below, the second door need not necessarily form any part of the roof). Accordingly, the first and second doors have different shapes, and they are not arranged symmetrically about a centreline of the vehicle. Moreover, as the first part of the roof of the cockpit is larger than any part of the roof of the cockpit formed by the second door, the second door may extend across a smaller portion of a width of the cockpit compared to the first door. This may facilitate reducing a width of the cockpit.

As the upper portion of the first door forms a larger part of the roof of the cockpit, the first door may be opened to reveal a large opening for accessing the cockpit. In particular, as the upper portion of the first door is arranged to form the first part of the roof of the cockpit when it is closed, the first door may be opened to move the first part of the roof in order to enable access to the cockpit. This may facilitate a user lowering themselves into one of the one or more seats, as well as rising out of their seat, as opening the first door to move the first part of the roof may enable the user to access the cockpit at least partially from above. This may be particularly beneficial where the one or more seats are close to the ground, as it may enable a user to enter the cockpit without having to crouch or bend down.

The first door may thus be arranged to act as a main door of the vehicle, which may be used for entering and exiting the cockpit in everyday use. In contrast, the second door may not be intended for everyday use, such that it does not need to form such a large part of the roof of the cockpit. Rather, the second door may be arranged as an auxiliary (or secondary) door of the vehicle, which is mainly used for exiting the vehicle in case of emergency. In particular, the second door may be configured as an emergency exit, through which a user may exit the cockpit if the first door becomes blocked or inoperable. As the upper portion of the first door forms part of the roof when the first door is closed, there may be a risk that the first door may be blocked shut if the vehicle rolls over in an accident. Providing the second door may thus improve safety of the vehicle, by providing an additional route for exiting the vehicle.

Accordingly, the arrangement of the first and second doors may facilitate access to the cockpit, whilst ensuring safety of the vehicle. Additionally, due to the asymmetrical arrangement of the doors, a size (e.g. width) of the cockpit may be reduced whilst still maintaining a sufficiently large first door to provide easy access to the cockpit.

Where the cockpit contains multiple seats (e.g. two or more seats), the first door and/or the second door may be arranged to provide access to each of the seats. Thus, a user may enter and/or exit any of the one or more seats via the first door and/or the second door. Additionally or alternatively, the body may comprise a further door (or doors) to facilitate access to the one or more seats. For example, where the cockpit contains a first seat, and a second seat disposed behind the first seat, the first door and the second door may be arranged to provide access to the first seat. Then, the body may further comprise a third door, arranged on the same side of the cockpit as the first door, for providing access to the second seat. The body may also further comprise a fourth door, arranged on the same side of the cockpit as the second door, for providing access to the second seat. The third door may have a similar shape to the first door, whilst the fourth door may have a similar shape to the second door, i.e. a part of the roof of the cockpit formed by the third door when it is closed may be larger than any part of the roof of the cockpit formed by the fourth door when it is closed.

In some embodiments, when the second door is closed, an upper portion of the second door may be arranged to form a second part of the roof of the cockpit, the second part of the roof of the cockpit being smaller than the first part of the roof of the cockpit. Thus, when the second door is closed, the upper portion of the second door may be disposed over at least one of the one or more seats. The upper portion of the second door may correspond to a second part of the roof of the body when the second door is closed. The second door may further comprise a lower portion, which is arranged to form part of a side of the cockpit (e.g. a sidewall of the cockpit) when the second door is closed. Similarly to the first door, by providing the second door with an upper portion that forms part of the roof of the cockpit when the second door is closed, access to the cockpit via the second door may be facilitated. As the second part of the roof is smaller than the first part of the roof, the upper portion of the second door may be smaller than the upper portion of the first door. The first part of the roof of the cockpit may correspond to an area of the roof that is larger than an area corresponding to the second part of the roof of the cockpit.

Alternatively, when the second door is closed, the second door may not form any part of the roof of the cockpit. For example, the second door may be arranged entirely on a side of the cockpit. Thus, the second door may be arranged to form part of a side (or sidewall) of the cockpit when it is closed. Arranging the door so that it does not form any part of the roof of the cockpit when it is closed may serve to ensure that the second door can be opened in a case where the vehicle has rolled onto its roof in an accident (and where the first door may be blocked shut). In this manner, safety of the vehicle may be improved. This may also reduce a width of the cockpit across which the second door extends, which may facilitate reducing the width of the cockpit.

The first door may be larger than the second door, i.e. a size of the first door may be greater than a size of the second door. In this manner, the first door may act as a main door which is convenient for entering and exiting the vehicle during everyday use, whilst the second door may act as an auxiliary door. The size of a door may be defined as an area on the surface of the body that is formed by that door when the door is closed. Thus, a larger door may reveal a larger opening in the body when it is opened, which may facilitate entering and exiting the cockpit. Accordingly, the first door may be arranged to form a larger area on the surface of the body when it is closed compared to the second door. Additionally or alternatively, the size of a door may be defined as a height of the door, e.g. a distance between an upper end and a lower end of the door. So, the first door may have a greater height than the second door. This may reduce the need to crouch or bend down when entering the vehicle via the first door.

The first part of the roof of the cockpit may extend across a centreline of the vehicle. In other words, when the first door is closed, the upper portion of the first door may extend across the centreline of the vehicle. As a result, more than half of a width of the roof may be formed by the upper portion of the first door when the first door is closed. This may greatly facilitate entering and exiting the cockpit as, when the door is opened, more than half of the width of the roof may be moved in order to provide access to the cockpit. The centreline of the vehicle may be defined as a central line (or axis) that extends in a longitudinal direction of the vehicle, and that is equidistant from the left-hand and right-hand sides of the vehicle. Alternatively, the first part of the roof of the cockpit may be defined as extending across a central plane of the vehicle, where the central plane is a vertical plane that extends along the centreline of the vehicle.

The body may comprise a fixed roof portion, and a centre of the fixed roof portion may be laterally offset from the centreline of the vehicle. The fixed roof portion may be a fixed structure that is part of the body, and which does not move when either of the doors is moved (i.e. the fixed roof portion is not part of the first and/or second doors). The fixed roof portion may form part of the roof of the cockpit, such that it is disposed over the one or more seats. Thus, in addition to the first part of the roof formed by the upper portion of the first door (and optionally the second part of the roof formed by the upper portion of the second door), the roof of the cockpit may include a part formed by the fixed roof portion of the body. The fixed roof portion may thus act to reinforce the roof of the cockpit, which may improve a safety of the cockpit. In particular, the fixed portion of the roof may help to preserve an integrity of the cockpit where the vehicle is involved in an accident, e.g. rolls over. A width of the first part of the roof of the cockpit, provided by an upper portion of the first door, may be wider than a width of the fixed roof portion. The fixed roof portion may extend over the one or more seats in a longitudinal direction, e.g. from a rear of the cockpit towards a front of the cockpit. The centre of the fixed roof portion being laterally offset from the centreline of the vehicle may mean that a width of the fixed roof portion is not centred about the centreline of the vehicle.

As the second door forms a smaller part of the roof of the cockpit compared to the first door, a width of the fixed roof portion may be increased, e.g. compared to a vehicle having a symmetrical door arrangement. This may enable a stiffness and strength of the fixed roof portion to be increased, thus improving a safety of the cockpit. A width of the fixed roof portion may be determined in order to provide a desired stiffness and strength of the fixed roof portion, to ensure safety of the cockpit. Thus, the overall width of the cockpit may be reduced, whilst still retaining a suitably dimensioned fixed roof portion to ensure safety of the cockpit.

The fixed roof portion may be connected to a front pillar and/or a rear pillar of the body. In this manner, the fixed roof portion may be supported by front and/or rear pillars of the body, which may improve a strength and safety of the cockpit. As an example, the fixed roof portion may be connected to front pillars which are located on either side of the windscreen of the vehicle, and/or to rear pillars which are located on either side of the one or more seats. Rear pillars may be located closer to a rear of the vehicle than the one or more seats. Front pillars of the vehicle may conventionally be referred to as "A" pillars, whilst rear pillars of the vehicle may be conventionally referred to as "B" or "C" pillars. The front and/or rear pillars of the body may correspond to portions of the body which extend in a generally upwards (or vertical) direction. The front and/or rear pillars of the body may be arranged to connect the fixed roof portion to a lower part of the body. In some cases, the fixed roof portion may be integrally formed with the front and/or rear pillars, e.g. these parts may be welded together, or cast or laid up as a single part.

The first door and/or the second door may be pivotable relative to the fixed roof portion between an open position and a closed position. For instance, the first door and/or the second door may be pivotably mounted to the fixed roof portion. Thus, the fixed roof portion may act as a support for the first door and/or the second door. This may enable the first door and/or the second door to be configured as a gull-wing door. For example, the fixed roof portion may comprise a first pivotable coupling (e.g. a hinge) about which the first door is pivotable, and/or a second pivotable coupling (e.g. a hinge) about which the second door is pivotable. In some cases, only the first door may be pivotably mounted to the fixed roof portion, with the second door being formed in a side (e.g. a sidewall) of the body. Then, the fixed roof portion may be continuous with the side of the body in which the second door is formed.

In some embodiments, the first door and the second door may correspond to different door types. In other words, the first door may be a door of a first type, and the second door may be a door of a second type. Using doors of different types on either side of the cockpit may enable the design of each door to be tailored to its intended purpose, as well as facilitate reducing a width of the cockpit. For instance, the first door type may be selected to facilitate entering and exiting the cockpit, whilst a more compact door type may be selected for the second door. Herein, a door type may be any known vehicle door type including, for example, a conventional door (e.g. hinged at a front of the door), a coach door (e.g. hinged at a rear of the door), a gull-wing door, a horizontal or vertical sliding door, a hatch door, a butterfly door, a scissor door or a dihedral synchro-helix door. Doors of different door types may be coupled to the body in a different manner, e.g. using a different kind of mechanism and/or at a different location on the body. For example, where the first door and the second door are each coupled to the body via a first hinge and a second hinge, respectively, the first hinge and the second hinge may be placed at different longitudinal positions on the body, and/or the first hinge and the second hinge may be oriented along different directions. All or part of either or both of the first or second doors may be transparent.

As an example, the first door may be a gull-wing door, and the second door may be a second, different type of door. The gull-wing door may provide a large opening in the body via which a user can easily enter or exit the cockpit. The second door may then be any of a conventional door, a coach door, a horizontal or vertical sliding door, a hatch door, a butterfly door, a scissor door or a dihedral synchro-helix door. The gull-wing door may be pivotably connected to the fixed roof portion of the body, mentioned above. However, due to this arrangement, the gull-wing door may be difficult to open in a case where the vehicle has rolled onto its roof in an accident. However, as the second door is of a different type, it may be easier to open in such a situation, and may thus facilitate exiting the vehicle in an accident.

In a particular example, the first door may be a gull-wing door, and the second door may be a hatch door, where the hatch door is arranged in a side (e.g. sidewall) of the body. The hatch door may include a handle (e.g. disposed inside the cockpit), which is operable to remove the hatch door from the body. In this manner, an occupant of the vehicle may operate the handle of the hatch door to remove the hatch door from the body, and exit the cockpit via a corresponding opening in the body. In other words, the hatch door may not be coupled to the body via any hinges or other movable coupling, such that the user can completely remove the hatch door from the body when operating the handle. Where the second door is a hatch door, the hatch door may further include a movable panel configured to alternately cover and uncover an aperture in the hatch door. The panel may be situated between an interior and an exterior of the vehicle such that it separates an interior of the cockpit and an outside of the vehicle. Such a panel in the hatch door may be used by the occupant, for example, to improve a ventilation of the cockpit.

In some cases, the first door and the second door may correspond to a same door type. Nevertheless, in such cases, the first and second door may still have different shapes and sizes, as discussed above.

An aerodynamic feature may be disposed on the upper portion of the first door. This may serve to improve an aerodynamic profile of the vehicle. As the upper portion of the first door forms the first part of the roof of the cockpit when it is closed, the aerodynamic feature may be located on the roof of the cockpit when the first door is closed. The aerodynamic feature may thus serve to guide air flow over the roof of the cockpit. Where the first part of the roof of the cockpit extends across the centreline of the vehicle, the aerodynamic feature may be arranged such that it is vertically aligned with the centreline of the vehicle when the first door is shut. In this manner, the aerodynamic feature may be centrally located on the roof of the cockpit, which may improve a symmetry of an effect of the aerodynamic feature on the air flow over the roof of the cockpit. The aerodynamic feature may comprise any suitable feature or structure for guiding air flow over the upper portion of the first door. For example, the aerodynamic feature may comprise a fin, an aerofoil, and/or one or more channels formed in a surface of the upper portion of the first door.

The cockpit may have a maximum width that is smaller than a maximum width of the vehicle. In other words, the width of the cockpit may be reduced compared to an overall width of the vehicle, this may reduce a total mass of the vehicle, as well as improve an aerodynamic profile of the vehicle, whilst maintaining a suitable vehicle width for ensuring stability and manoeuvrability of the vehicle. In particular, by making the overall width of the vehicle greater than the width of the cockpit, a front and/or rear track width of the vehicle may be greater than the width of the cockpit, which may improve a stability of the vehicle. This may be particularly beneficial for a vehicle having a single file seat arrangement like that of the invention, as a cockpit for such a vehicle may be relatively narrow and therefore, without an increased track width, the vehicle may be prone to tipping when going around a bend. As mentioned above, the maximum width of the cockpit may correspond to a maximum distance between a left-hand side and a right-hand side of the cockpit. Similarly, the maximum width of the vehicle may correspond to a maximum distance between a left-hand side and a right-hand side of the vehicle. The front track width of the vehicle may correspond to a distance between centres of the front wheels of the vehicle; the rear track width of the vehicle may correspond to a distance between centres of the rear wheels of the vehicle.

A maximum width of the cockpit may be between 600 mm and 1600 mm, and a maximum width of the vehicle may be between 1200 mm and 1600 mm. Such ranges of widths for the cockpit and the vehicle may result in an improved stability of the vehicle. In some cases, a maximum width of the cockpit may be between 600 mm and 1000 mm, and a maximum width of the vehicle may be between 1200 mm and 1600 mm. As an example, a maximum width of the cockpit may be 800 mm, whilst a maximum width of the vehicle may be 1300 mm.

A hinge (or hinge mechanism) that couples the first door to the body may comprise an explosive charge. The explosive charge may be arranged to release the door from the body when it is set off, e.g. by breaking the hinge. This may facilitate opening the first door and/or removing the first door from the body in an emergency so that an occupant can exit the cockpit. This may be particularly useful where the first door has become blocked and is prevented from pivoting about the hinge. In particular, as the first door forms the first part of the roof of the cockpit when it is closed, it may be blocked shut if the vehicle rolls onto its roof in an accident. Setting off the explosive charge in the hinge may thus enable the first door to be released from the body so that the occupant can exit the cockpit. The vehicle may comprise an actuator (e.g. in the form of a handle or button) that may be operated to set off the explosive charge. The actuator may be disposed within the cockpit, so that an occupant of the cockpit can set off the explosive charge if needed. The vehicle may also be configured to automatically set off the explosive charge, e.g. if the vehicle becomes inverted. For example, the hinge may comprise a pyrotechnic fastener, or an explosive bolt.

Additionally or alternatively, a hinge (or hinge mechanism) that couples the second door to the body may comprise an explosive charge. Similarly to above, the explosive charge may be arranged to release the second door from the body when it is set off, and the vehicle may comprise an actuator that may be operated to set off the explosive charge. Where the hinges of both doors are fitted with explosive charges, a single actuator may be used for both doors.

The first door may be movably connected to the body via a mechanical coupling, and the vehicle may comprise a release mechanism that is operable to undo the mechanical coupling so that the first door can be removed from the body. Thus, when the release mechanism is operated, the mechanical coupling between the first door and the body may be undone, so that the first door can be removed from the body. This may enable the first door to be removed in cases where the door cannot be opened in a usual manner, e.g. where the non-emergency door mechanism has become inoperable. The release mechanism may operate in any suitable manner for undoing the mechanical coupling. As an example, the first door may be coupled to the body via a hinge or hinge mechanism, and the release mechanism may be operable to remove a pin from the hinge, in order to undo the mechanical coupling and release the first door from the body.

Similarly, the second door may be movably connected to the body via a mechanical coupling, and the vehicle may comprise a release mechanism that is operable to undo the mechanical coupling so that the second door can be removed from the body. The release mechanism for the second door may be similar to that discussed above for the first door. The vehicle may comprise a respective release mechanism for each door.

The release mechanism(s) may comprise an actuator (e.g. in the form of a button or handle) for operating the release mechanism, where the actuator is disposed within the cockpit. In this manner, an occupant of the cockpit can operate the release mechanism(s) to release the first and/or second door from the body, if needed.

The first door may comprise a first portion and a second portion, the second portion being pivotable relative to the first portion when the first door is opened. This may enable the first portion and the second portion of the first door to be pivoted towards one another or folded together when the first door is opened, such that a size of the first door may be reduced when the first door is opened. This may facilitate opening the first door when the vehicle is located in a confined space. As a result, it may be possible to park the vehicle in a confined space, whilst still being able to access the cockpit via the first door. For instance, the first portion of the first door may correspond to the upper portion of the first door mentioned above, and the second portion of the first door may correspond to a lower portion of the first door. As an example, where the first door is a gull-wing door, the first portion and the second portion may be folded together when the first door is opened, in order to reduce a total height of the door.

The body may comprise a step, the first door being arranged to at least partially cover the step when the first door is closed. Then, when the first door is opened, the step may be revealed, such that a user may use the step when entering and/or exiting the cockpit. Thus, entering and exiting the cockpit via the first door may be facilitated. On the other hand, the body may not include an equivalent step on the opposite side of the vehicle, as the second door may be configured as an auxiliary door which is not typically used during everyday use. Providing a step on only one side of the cockpit may enable a width of the cockpit to be reduced.

The first door may comprise a first side impact structure. The first side impact structure may serve to protect an occupant of the vehicle in case of an impact to the side of the vehicle with the first door, thus reducing a risk of injury to the occupant. As the first side impact structure is part of the first door, it may move with the first door when the first door is opened, in order to facilitate access to the cockpit. For example, the first side impact structure may be built into the first door.

The body may further comprise a second side impact structure that is on a same side of the cockpit as the second door. The second side impact structure may therefore serve to protect an occupant of the vehicle in case of an impact to the side of the vehicle with the second door. However, the second side impact structure may not be in the second door, but instead in a fixed side portion of the body, i.e. a portion of the body that is on the same side of the cockpit as the second door. Thus, the second side impact structure may not move with the second door, such that it may remain fixed when the second door is opened. Providing the second side impact structure in the fixed side portion of the body rather than in the second door may enable a size of the second door to be reduced, without compromising safety of the cockpit. The second side impact structure may have a same size and shape as the first impact structure, however rather than being provided in a door of the cockpit, it may be provided in a fixed portion of the body. An occupant of the cockpit may thus be protected on either side by the side impact structures.

The first and/or second side impact structure may be configured to absorb an impact to the corresponding side of the vehicle. In particular, each side impact structure may serve to decelerate an object (e.g. car) which impacts a side of the vehicle. Each side impact structure may have a thickness of at least 250 mm. Such a thickness may be sufficient to avoid moderate or severe injury to the occupant of the vehicle in case of a 30 miles per hour (which is a typical speed in an urban area) impact to a side of the vehicle. Each side impact structure may be made of materials and have a design that are configured to absorb and dissipate a large amount of energy during an impact. For example, a side impact structure may be configured to be crushed or deformed during an impact, in order to absorb energy from the impact. A side impact structure including metallic materials (e.g. made of steel) may be designed to absorb energy by deforming permanently. A side impact structure including composite materials (e.g. carbon fibre materials) may be designed to absorb energy by fracturing, collapsing and/or disintegrating. A side impact structure may have a box-like structure which is arranged to deform (e.g. crumple, collapse, fracture) during an impact to absorb and dissipate energy from the impact. As an example, a side impact structure may have an outer shell formed of carbon fibre, and a core made of aluminium honeycomb or a structural foam.

The first door may comprise a first airbag. The first airbag may serve to protect an occupant of the vehicle in case of an impact to the vehicle, thus reducing a risk of injury to the occupant. In particular, the first airbag may be configured to inflate in response to an impact to the vehicle. As discussed above, the first door may be relatively large, thus facilitating integration of the first airbag into the first door. As the first airbag is disposed in the first door, it may move with the first door when the first door is opened, which may facilitate access to the cockpit. In some cases, the first door may comprise the first airbag, as well as the first side impact structure mentioned above.

Additional airbags may be provided at various locations within the cockpit, to further improve safety of the cockpit. For example, airbags may be provided in the fixed roof portion, a front pillar of the body, and/or a rear pillar of the body. In some cases, the vehicle may further comprise a second airbag that is on a same side of the cockpit as the second door. The second airbag may therefore serve to protect an occupant of the vehicle in case of an impact to the vehicle, with the second airbag being configured to inflate in response to an impact to the vehicle. However, the second airbag may not be in the second door, but instead in a fixed side portion of the body, e.g. the fixed side portion of the body mentioned above in relation to the second side impact structure. Thus, the second airbag may not move with the second door, such that it may remain fixed when the second door is opened. Providing the second airbag in the fixed side portion of the body rather than in the second door may enable a size of the second door to be reduced, without compromising safety of the cockpit. Additionally, this may avoid having to include electrical connections to the second door, which may facilitate removing the second door from the body (e.g. where the second door is configured as a removable hatch). The second airbag may have a same size and shape as the first airbag, however rather than being provided in a door of the cockpit, it may be provided in a fixed portion of the body. An occupant of the cockpit may thus be protected on either side by the first and second airbags.

Herein, a longitudinal direction may refer to a direction along a longitudinal axis of the vehicle, i.e. a direction along an axis linking a front of the vehicle to a rear of the vehicle. In other words, the longitudinal direction may correspond to a direction of forward motion of the vehicle. A lateral direction may refer to a direction perpendicular to the longitudinal direction, i.e. a direction along an axis linking a right-hand side to a left-hand side of the vehicle. Herein, a width may generally refer to a width in the lateral direction of the vehicle, unless stated otherwise.

BRIEF DESCRIPTION OF THE DRAWINGS

Examples of the invention are discussed below with reference to the accompanying drawings, in which.

DETAILED DESCRIPTION; FURTHER OPTIONAL FEATURES

Figure 1:
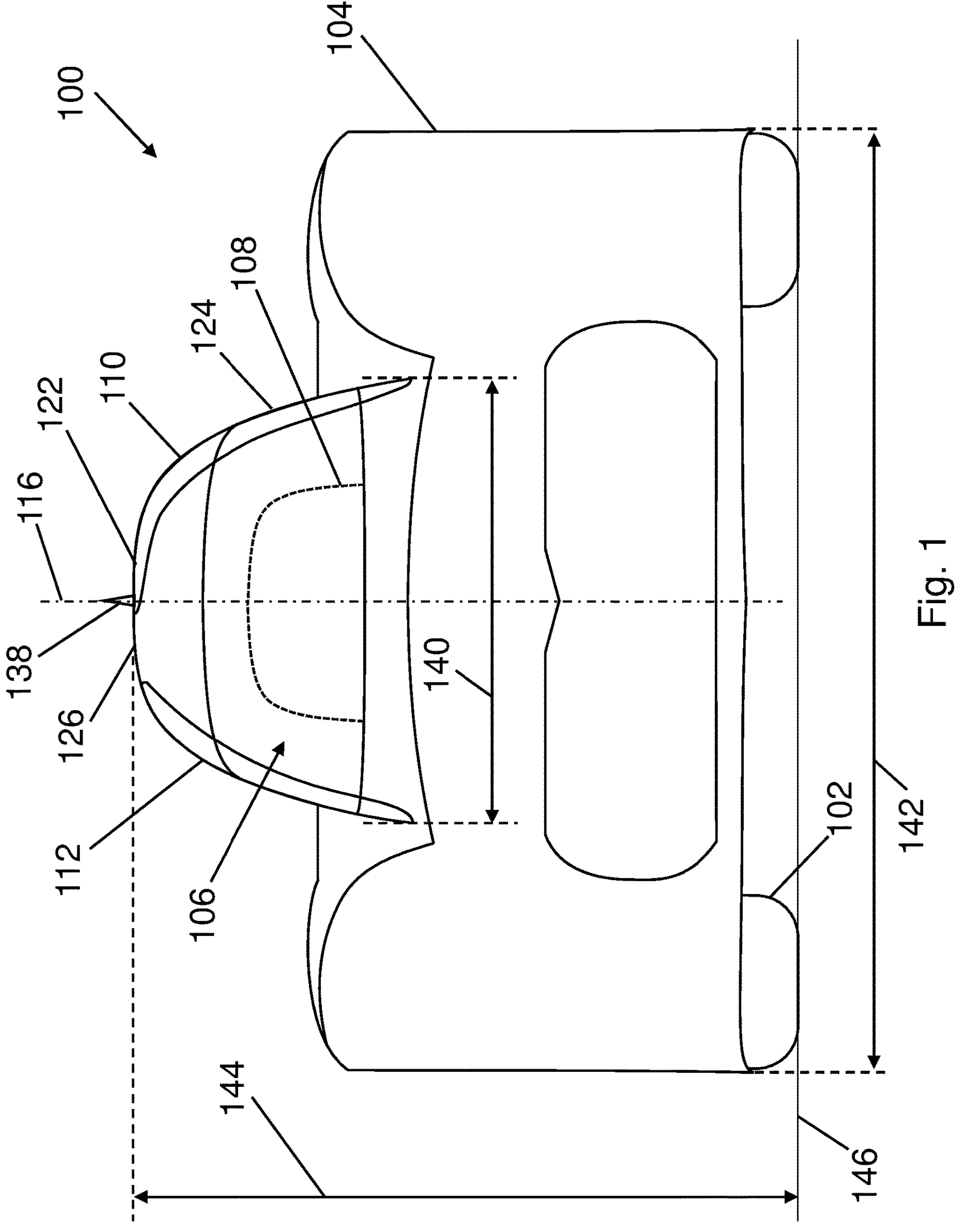
FIG. 1 is a schematic diagram of a front view of a vehicle according to an embodiment of the invention.
Figure 2:
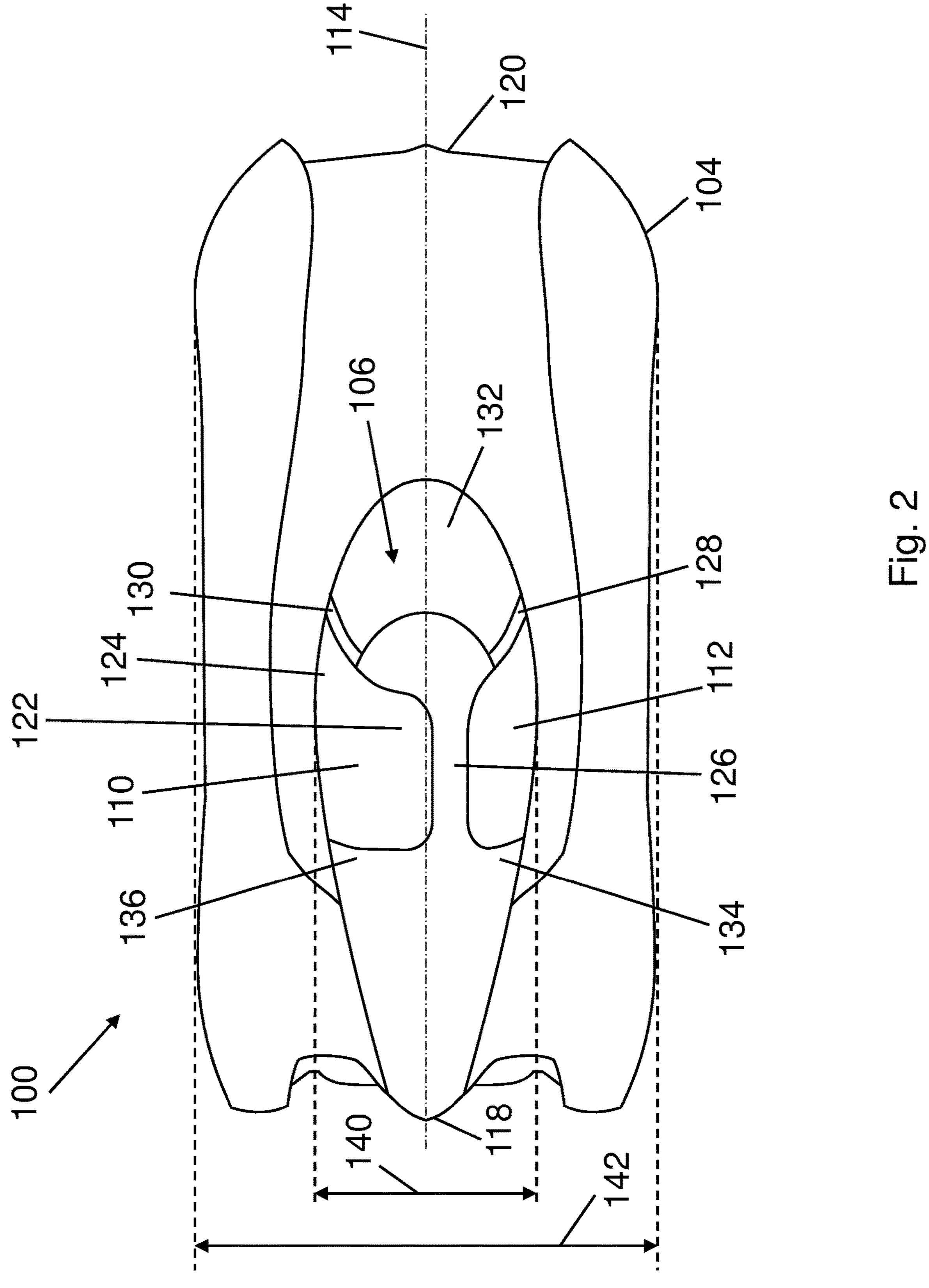
FIG. 2 is a schematic diagram of a top view of the vehicle of FIG. 1.
Figure 3:
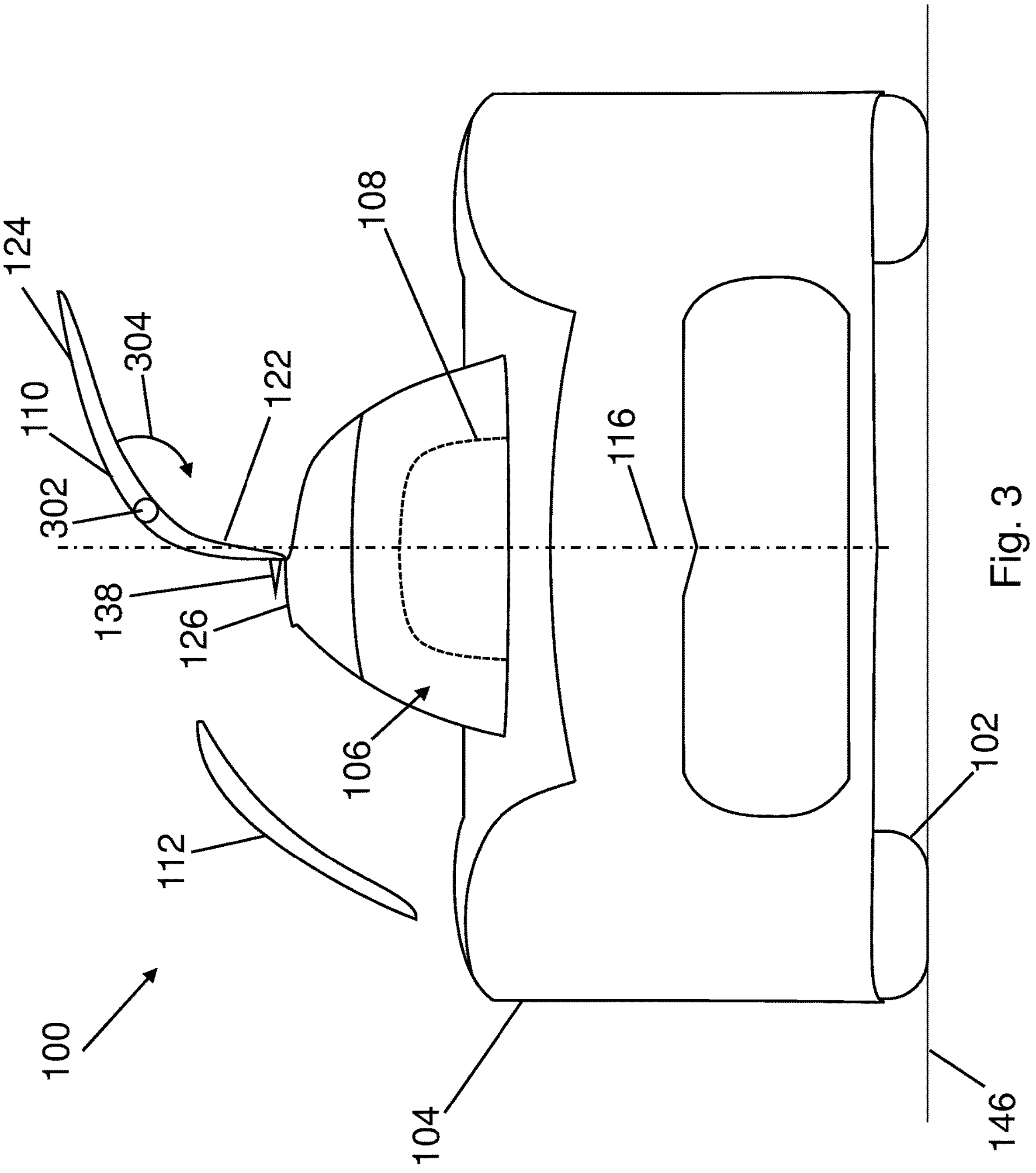
FIG. 3 is a schematic diagram of a front view of the vehicle of FIG. 1, where doors of the vehicle are in an open position.

A vehicle 100 according to an embodiment of the invention is illustrated in FIGS. 1-3. FIG. 1 is a schematic front view of the vehicle 100; FIG. 2 is a schematic top view of the vehicle 100 (i.e. where the vehicle 100 is viewed from above); and FIG. 3 is a schematic front view of the vehicle 100 where doors of the vehicle are in an open position. In the example shown, the vehicle 100 is a road car which is designed to be driven on a road.

The vehicle 100 includes four wheels 102, i.e. two front wheels and two rear wheels, which are coupled to a chassis. The vehicle 100 comprises a monocoque chassis such that a body 104 of the vehicle 100 is integrally formed as a single structure with the chassis. In particular, a floor, sides and roof of a cockpit 106 of the vehicle 100 may be defined by the monocoque. The monocoque may be a shell-like structure which is integrally formed (e.g. moulded) as a single part. The monocoque may, for example, be made of a carbon fibre material. Other parts of the vehicle may be made, for example, of plastics, composite materials such as reinforced polymers (e.g. carbon fibre reinforced polymers), metals (e.g. aluminium, steel), or any other suitable materials. In other embodiments, the body 104 of the vehicle 100 may be a separate part from a chassis or frame of the vehicle 100, and may be mounted to the chassis or frame.

The cockpit 106 is defined within the body 104 of the vehicle 100, the cockpit 106 containing a single seat 108 (indicated in dashed lines in FIGS. 1 and 3) for receiving an occupant of the vehicle 100. Thus, the cockpit 106 is designed to receive only a single person, namely a driver of the vehicle 100 (or a passenger where the vehicle 100 is self-driving). In addition to the seat, the cockpit 106 contains any controls and displays necessary for controlling the vehicle 100, e.g. steering wheel, accelerator pedal, brake pedal, dashboard. Where a separate body and chassis are used, the cockpit 106 may be defined at least in part by the body of the vehicle 100 that is mounted on the chassis.

The body 104 includes a first door 110 and a second door 112 for accessing the cockpit 106, such that a user may enter and/or exit the cockpit 106 via either of the first and second doors 110, 112. The first door 110 is arranged on the left-hand side of the cockpit 106 (from the point of view of a person sitting in the seat 108), whilst the second door 112 is arranged on the right-hand side of the cockpit 106. Each of the first door 110 and the second door 112 is movable between a closed position and an open position. FIGS. 1 and 2 depict the vehicle 100 where both the first door 110 and the second door 112 are in the closed position, whilst FIG. 3 depicts the vehicle 100 where both the first door 110 and the second door 112 are in the open position. When the first door 110 is in the open position, the first door 110 reveals an opening in the body 104 via which a user may enter and exit the cockpit 106. Similarly, when the second door 112 is in the open position, the second door 112 reveals an opening in the body 104 via which the user may enter and exit the cockpit 106. The first door 110 and the second door 112 are arranged such that they are asymmetrical with respect to a centreline 114 or central plane 116 of the vehicle 100. In particular, the first door 110 is larger than the second door 112, such that the opening in the body 104 corresponding to the first door 110 is larger than the opening in the body 104 corresponding to the second door 112. As depicted in FIG. 2, the centreline 114 of the vehicle 100 is a central axis of the vehicle 100 which extends in a longitudinal direction of the vehicle 100 (i.e. along a direction linking a rear 118 of the vehicle 100 to a front 120 of the vehicle 100), and which is equidistant from left-hand and right-hand sides of the vehicle 100. The corresponding central plane 116 is depicted in FIGS. 1 and 3, the central plane 116 being a vertical plane that extends along the centreline 114 of the vehicle 100.

The first door 110 comprises an upper portion 122, which is arranged such that it is disposed over the seat 108 when the first door is closed. Additionally, as shown in FIG. 1, the upper portion 122 of the first door 110 extends in a substantially horizontal direction when the first door 110 is closed. Thus, when the first door 110 is closed, it effectively forms a first part of a roof of the cockpit 106. Moreover, the upper portion 122 of the first door 110 extends across the centreline 114 of the vehicle 100, i.e. it crosses the central plane 116 of the vehicle 100. The first door 110 further comprises a lower portion 124, which is arranged to form part of a left-hand sidewall of the cockpit 106 when the first door 110 is closed. In contrast, the second door 112 is arranged to primarily form part of a right-hand sidewall of the cockpit 106 when it is closed. Any part of the roof of the cockpit 106 formed by the second door 112 is smaller than the first part of the roof formed by the upper portion 122 of the first door 110, and in some cases the second door 112 may not form any part of the roof of the cockpit 106 when it is closed.

The body 104 comprises a fixed roof portion 126 which is arranged above the seat 108 such that it forms part of a roof of the cockpit 106. Thus, the roof of the cockpit 106 may be formed by the fixed roof portion 126 and the upper portion 122 of the first door 110 when the first door 110 is closed. The fixed roof portion 126 extends in the longitudinal direction of the vehicle 100 (i.e. along the direction of the centreline 114), and is disposed between the first and second doors 110, 112. The fixed roof portion 126 is a portion of the body 104 that does not move with either of the doors, and whose position over the seat 108 remains fixed when either of the first and second doors 110, 112 is opened. As can be seen in the figures, the fixed roof portion 126 is laterally offset from the centreline 114 (and similarly the central plane 116) of the vehicle 100, i.e. the fixed roof portion 126 is not centred over the centreline 114. This is to accommodate the upper portion 122 of the first door 110, which extends across the centreline 114 of the vehicle 100. The fixed roof portion 126 may be connected to front and/or rear pillars of the body 104. For instance, as shown in FIG. 2, the fixed roof portion 126 may be connected to a right front pillar 128 and to a left front pillar 130, which are located on either side of a windscreen 132 at a front of the cockpit 106. The fixed roof portion 126 may further be connected to a right rear pillar 134 and a left rear pillar 136, which are located on either side of the cockpit towards a rear of the cockpit 106. The pillars 128, 130, 134, 136 may serve to connect the fixed roof portion 126 to a lower part of the body 104, such that they act as a support structure for the fixed roof portion 126. This may serve to increase a strength of the cockpit 106, and may ensure that the cockpit 106 is not crushed if the vehicle 100 rolls onto its roof in an accident. In some cases, the fixed roof portion 126 may be made of a sandwich-structure composite material, which includes two outer skins made of a stiff material between which a strong and lightweight material is sandwiched. For example, the fixed roof portion 126 may be made of a carbon fibre reinforced polymer (CFRP) sandwich-structure, where a lightweight material (such as a structural foam or honeycomb material) is sandwiched between two layers of CFRP material. Such a sandwich-structure may provide the fixed roof portion 126 with a high level of stiffness and strength whilst making it relatively lightweight.

In the example shown, the first door 110 is configured as a gull-wing door, and is pivotably mounted to the body 104 such that it is pivotable about an axis that is substantially horizontal and which is aligned with the centreline 114. The first door 110 may be pivotably mounted to the body 104 via a hinge or hinge mechanism. The first door 110 may be pivotably mounted to a portion of the body 104 that forms part of a roof of the cockpit 106 (i.e. which is disposed above the seat 108). For example, the first door 110 may be pivotably mounted to the fixed roof portion 126. The second door 112 is configured as a hatch door that forms part of the right-hand sidewall of the cockpit 106 when it is closed. The second door 112 is removable (i.e. detachable) from the body 104. Thus, opening the second door 112 may involve removing it from the body 104, as illustrated in FIG. 3. Unlike the first door 110, the second door 112 is not movably connected to the body 104, i.e. the second door 112 is not coupled to the body 104 via a hinge or other movable coupling. This may facilitate removal of the second door 112 from the body 104. In this manner, an occupant of the cockpit 106 may open the second door 112 and push it away from the body 104, in order to exit the cockpit 106. The second door 112 may comprise a lock mechanism for securing it to the body 104 when it is closed. Then, to open the second door 112, the lock mechanism may be unlocked (e.g. via a handle or button located inside the cockpit 106) in order to release the second door 112 from the body 104.

As shown in FIG. 3, when the first door 110 is moved to the open position, it is pivoted upwards relative to the rest of the body 104. In particular, as the upper portion 122 of the first door forms a first part of the roof of the cockpit 106 when it is closed, the first part of the roof of the cockpit 106 is pivoted out of the way when the first door 110 is opened. As a result, the cockpit 106 can be accessed from above via the first door 110, which may enable a user to lower themselves into the cockpit 106. This may facilitate entering and exiting the cockpit 106, as it may avoid the user having to crouch or bend down when doing so. In contrast, as the second door 112 is formed as a hatch in the right-hand sidewall of the cockpit 106, it may not provide access to the cockpit 106 from above. As a result, the second door 112 may be somewhat less convenient for entering and exiting the cockpit 106, as a user may need to crouch or bend down when entering or exiting the cockpit 106 via the second door 112. Accordingly, the first door 110 may be used as a main door, via which the cockpit 106 is accessed during everyday use. The second door 112 may on the other hand be used as an auxiliary (or secondary) door, which is used mainly in cases where the first door 110 is blocked or inaccessible for some reason.

The asymmetrical arrangement of the first and second doors 110, 112 may enable a size of the cockpit 106 to be minimised, whilst still maintaining good access to the cockpit 106 by virtue of the large first door 110. In particular, as the second door 112 is not intended for everyday use, its size may be reduced compared to the first door 110, so that an overall size (e.g. a width) of the cockpit 106 may be reduced. Nevertheless, the second door 112 may improve safety of the vehicle 100, by providing an additional route for exiting the cockpit 106 in case of an accident. Due to the fact that the upper portion 122 of the first door 110 forms the first part of the roof of the cockpit 106, the second door 112 may be easier to open compared to the first door 110, in a situation where the vehicle 100 has rolled onto its roof in an accident.

The upper portion 122 of the first door 110 comprises an aerodynamic feature in the form of a fin 138. The fin 138, which may be in the shape of a shark fin or similar, is arranged on the upper portion 122 such that, when the first door 110 is closed, the fin 138 is centred about the centreline 114 (or similarly the central plane 116) of the vehicle. In other words, when the first door 110 is closed, the fin 138 is arranged over a middle of the roof of the cockpit 106. The fin 138 serves to guide air flow over the roof of the cockpit 106, and may thus serve to improve an aerodynamic profile of the cockpit 106. Further or alternative aerodynamic features may also be provided on the upper portion 122 of the first door 110 or on other parts of the roof of the cockpit 106, in order to guide air flow over the roof of the cockpit 106.

In some embodiments, the upper portion 122 and the lower portion 124 of the first door 110 may be pivotably connected together (e.g. via a hinge 302, as depicted in FIG. 3). In this manner, when the first door 110 is opened, the lower portion 124 may be pivoted towards the upper portion 122, e.g. as illustrated by the arrow 304 in FIG. 3. In this manner, the lower portion 124 and upper portion 122 can be folded towards one another, in order to reduce a size of the first door 110 when it is opened. This may serve to reduce a lateral extent of the first door 110 when it is opened. For example, this may serve to ensure that the first door 110 does not extend beyond a left-most side of the body when it is opened. The pivotable connection between the upper portion 122 and the lower portion 124 of the first door 110 may also serve to reduce a height of the first door 110 when it is opened. This may facilitate opening the first door 110 in a confined space, whilst still maintaining a large size of the first door 110 to provide easy access to the cockpit 106. Of course, other means for enabling the lower portion 124 to be pivoted toward the upper portion 122 when the first door 110 is opened may also be used.

As shown in FIGS. 1 and 2, a maximum width 140 of the cockpit 106 is smaller than a maximum width 142 of the vehicle 100. The maximum width 140 of the cockpit 106 corresponds to a maximum distance between a leftmost side and a rightmost side of the cockpit 106, whilst the maximum width 142 of the vehicle 100 corresponds to a maximum distance between a leftmost side and a rightmost side of the vehicle 100. The maximum width 140 of the cockpit 106 may be between 600 mm and 1600 mm, whilst the maximum width 142 of the vehicle 100 may be between 1200 mm and 1600 mm. As an example, the maximum width 140 of the cockpit 106 may be about 800 mm, whilst the maximum width 142 of the vehicle 100 may be about 1300 mm. As the vehicle 100 overall is wider than the cockpit 106, this may improve a stability of the vehicle 100. In particular, this enables a track width of the vehicle 100 to be greater than the width of the cockpit 106. For instance, as shown in FIG. 1, a front track width of the vehicle 100 (i.e. a distance between centres of the front wheels 102) is greater than the maximum width 140 of the cockpit 106. Making the cockpit 106 narrower than the overall vehicle 100 may also enable a height of a centre of mass of the vehicle 100 to be lowered. This is because, as the cockpit 106 does not take up the entire width of the vehicle 100, there may be more space available on either side of the cockpit 106 for components of the vehicle 100.

A maximum height 144 of the vehicle 100 may be less than 1400 mm. In other words, a distance between a ground surface 146 on which the vehicle 100 is disposed and an uppermost point of the vehicle 100 (i.e. of the body 104) may be less than 1400 mm. Preferably the maximum height 144 of the vehicle 100 may be less than 1250 mm. For example, the maximum height 144 of the vehicle 100 may be 1200 mm. However, the maximum height 144 of the vehicle 100 may be at least 1000 mm. This may ensure that there is sufficient height available within the cockpit 106 for a driver to sit in an upright position in the seat 108, i.e. without having to put the seat in a highly reclined position.

It should be noted that, in other embodiments, different combinations of door types for the first and second doors 110, 112 may be used. For example, instead of being configured as a hatch door, the second door 112 may instead be configured as a conventional door, a coach door, a gull-wing door, a horizontal or vertical sliding door, a butterfly door, a scissor door or a dihedral synchro-helix door. Likewise, a different type of door may be used for the first door 110 instead of a gull-wing door.

In the embodiment shown, the first door 110 is located on the left-hand side of the cockpit 106 whilst the second door 112 is located on the right-hand side of the cockpit 106. Of course, in other embodiments, the sides on which the first and second doors 110, 112 are arranged may be swapped.

In some embodiments (not shown), the cockpit 106 may contain a second seat, which is located behind the seat 108. Thus, the seats in the cockpit 106 may be in a single file, tandem arrangement. The second seat may be configured to receive a passenger of the vehicle 100, whilst the seat 108 may be configured as a driver seat. The fixed roof portion 126 may then extend over the seat 108 and the second seat. The first door 110 and the second door 112 may be used for accessing both seats in the cockpit 106. Alternatively, the first door 110 and the second door 112 may act as a first set of doors which are arranged to provide access to the seat 108, and the body may include a second set of doors for providing access to the second seat. The second set of doors may be arranged behind the first and second doors 110, 112, and may have a similar arrangement to the first and second doors 110, 112 discussed above.

Figure 4:
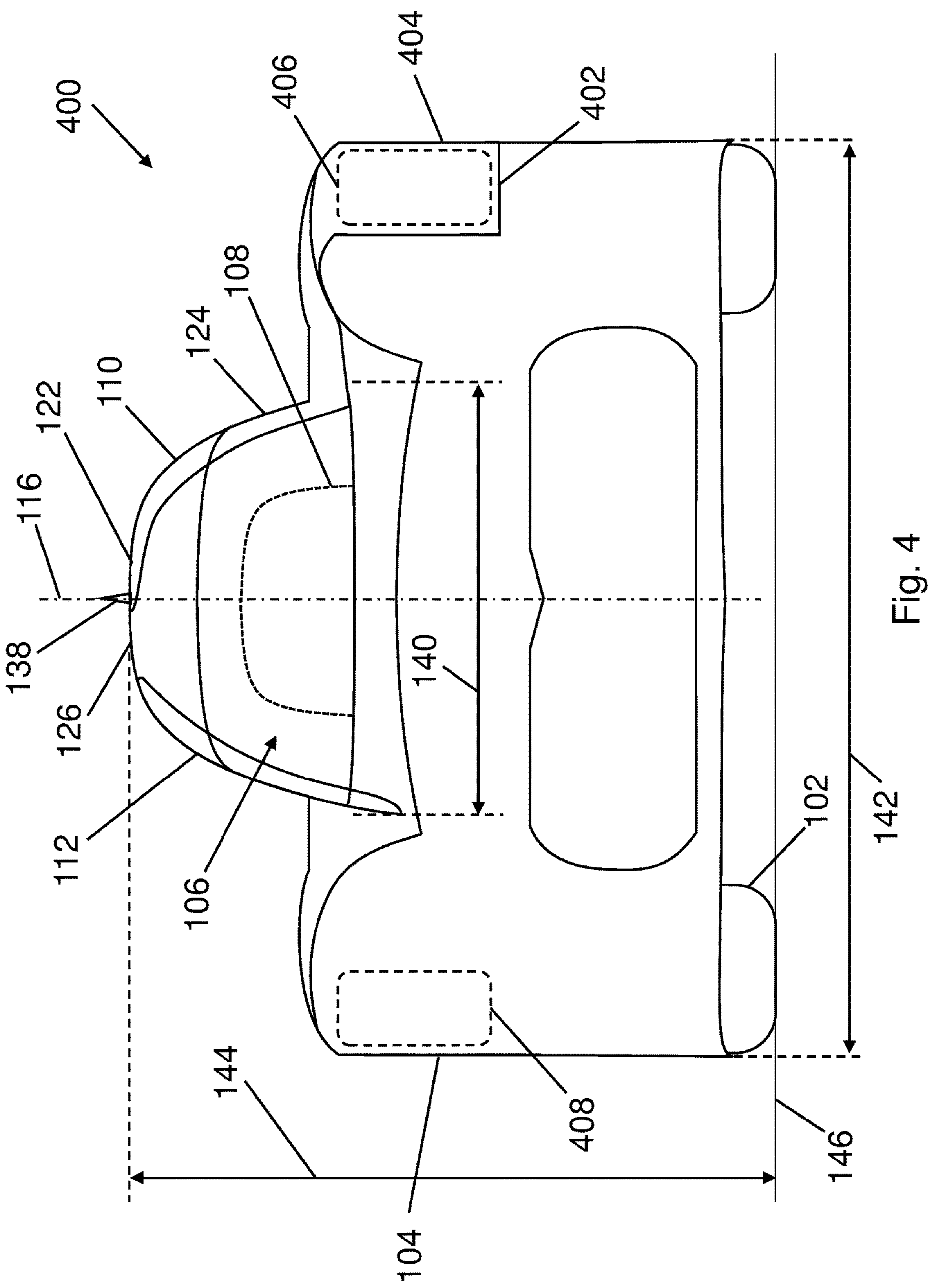
FIG. 4 is a schematic diagram of a front view of a vehicle according to an embodiment of the invention.
Figure 5:
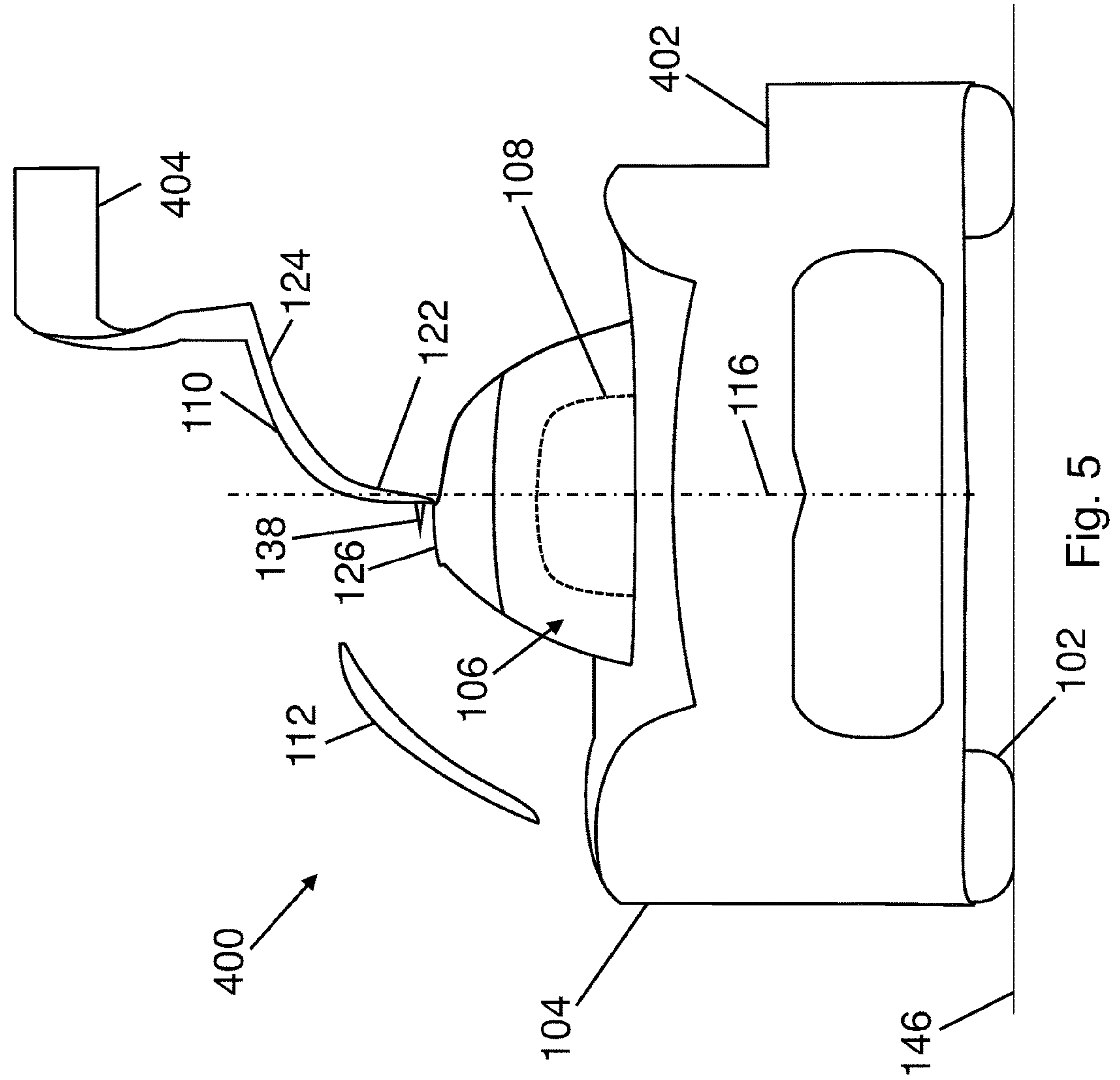
FIG. 5 is a schematic diagram of a front view of the vehicle of FIG. 4, where doors of the vehicle are in an open position.

FIGS. 4 and 5 show schematic front views of a vehicle 400 according to an embodiment of the invention. The vehicle 400 is similar in configuration of the vehicle 100 described above, and features of the vehicle 400 that correspond to features of the vehicle 100 are labelled in FIGS. 4 and 5 with the same reference numerals as in FIGS. 1-3, and are not described again. Any of the features or options discussed above in relation to the vehicle 100 may be shared with the vehicle 400. Similarly to the vehicle 100, the vehicle 400 comprises a first door 110 which is a gull-wing door, and a second door 112 which is a hatch door that is removable from the body 104. The first and second doors 110, 112 are depicted in their closed positions in FIG. 4, and in their open positions in FIG. 5.

The body 104 of the vehicle 400 comprises a step 402 that is disposed on the left-hand side of the cockpit 106, to facilitate a user entering and exiting the cockpit 106. The step 402 is formed in a left-hand side portion of the body 104, such that it is laterally spaced from the left-hand side of the cockpit 106. The first door 110 includes a covering portion 404 which extends outwards from the lower portion 124 of the first door 110, and which is arranged to cover the step 402 when the first door 110 is in the closed position. Thus, when the first door 110 is opened, the step 402 may be revealed, so that it can be used when accessing the cockpit via the first door 110. Providing the covering portion 404 to cover the step 402 when the first door 110 is closed may enable the step 402 to remain dry in wet conditions, so that it does not become slippery. This may also serve to keep the step 402 clean. As the second door 112 may not typically be used for everyday use, there may be no need to provide a corresponding step on the right-hand side of the cockpit 106. Providing a step only on one side of the cockpit 106 may enable the width 140 of the cockpit 106 to be reduced.

The body 104 may further include a first side impact structure 406 on the left-hand side of the cockpit 106 and a second side impact structure 408 on the right-hand side of the cockpit 106. The positions of the first and second impact structures 406, 408 are indicated by the dashed lines in FIG. 4, however in practice they would not be visible for the exterior of the vehicle 400. The side impact structures may serve to protect an occupant of the cockpit 106 in case of an impact to a side of the vehicle 100. The first side impact structure 406 may be integrated into the first door 110, where it may be disposed in the covering portion 404 of the first door 110. In this manner, the first side impact structure 406 may be located on a left-hand side of the cockpit 106 when the first door 110 is closed. The second side impact structure 408 may be integrated into a right-hand side portion of the body 104, which may be laterally spaced from the right-hand side of the cockpit 106. The second side impact structure 408 is not integrated into the second door 112, as the second door 112 is smaller than the first door 110 and does not have sufficient space for accommodating the second side impact structure 408. However, in some embodiments, the second door 112 may include a portion corresponding to the covering portion 404 of the first door 110, in which case the second side impact structure 408 may be housed in the second door 112.

The vehicle 400 (or vehicle 100) may also comprise first and second airbags (not shown) located on either side of the cockpit 106. The first airbag may be integrated into the first door 110, e.g. it may be located in the lower portion 124 of the first door 110. The second airbag may be located in the second door 112, or in a fixed side portion of the cockpit 106, depending on the size and shape of the second door 112. In particular, in some cases the second door 112 may be relatively small such that it only forms part of the right-hand sidewall of the cockpit 106. In such a case, the second airbag may be integrated into a fixed side portion on the right-hand side of the cockpit 106, as this may provide more room for the second airbag. This may also avoid having to provide electrical connections to an airbag in the second door 112 which, in the examples shown, is arranged as a hatch door that is removable from the body 104.

It is worth noting that, although FIGS. 4 and 5 show the step 402 and covering portion 404 of the first door 110 as being visible from the front of the vehicle 400, in practice these may not actually be visible from the front of the vehicle 400. This is because in practice these features may not extend all the way to the front of the vehicle 400, but would instead be aligned with the cockpit 106. For example, the step 402 and the covering portion 404 of the first door may extend approximately 500 mm in the longitudinal direction, being centred relative to a longitudinal position of the cockpit 106.

Figure 6:
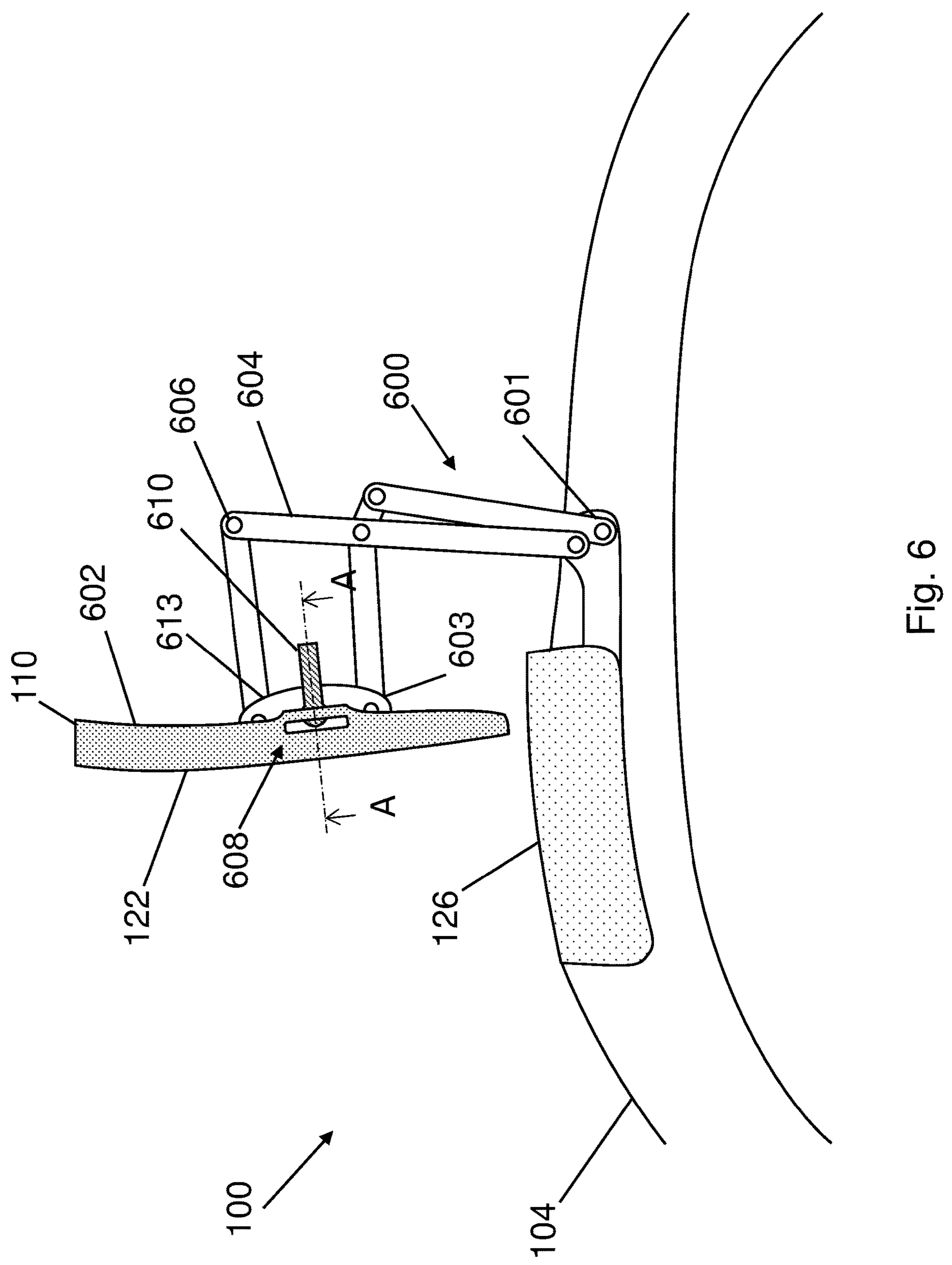
FIG. 6 is an expanded cross-sectional view of part of the vehicle of FIG. 1.

FIG. 6 shows an expanded cross-sectional front view of part of the vehicle 100 (and correspondingly of the vehicle 400), illustrating how the first door 110 may be connected to the body 104. For illustration purposes, only a part of the upper portion 122 of the first door 110 is depicted in FIG. 6. The upper portion 122 is connected to the body 104 of the vehicle via a hinge mechanism 600. The hinge mechanism 600 is connected at a first end 601 to a part of the body 104 which forms part of the roof of the cockpit 106, and at a second end 603 to an inner surface 602 of the upper portion 122 of the first door 110. In the example shown, the part of the body 104 to which the hinge mechanism 600 is connected to is the fixed roof portion 126. The inner surface 602 of the upper portion 122 of the first door 110 is arranged to face into the cockpit 106 when the first door 110 is closed. The hinge mechanism 600 comprises a set of bar linkages 604 which are coupled together via a set of joints 606, the hinge mechanism 600 being arranged to enable the first door to be moved (e.g. pivoted) relative to the body 104 between its open and closed positions. The hinge mechanism 600 may also include one or more springs and/or pistons (e.g. pneumatic or hydraulic cylinders), to facilitate moving the first door 110 from the closed position to the open position. The first door 110 may also comprise door handles (not shown) arranged on an inside and/or an outside of the first door 110, in order to open the door when it is in the closed position. In FIG. 6, the first door 110 is depicted in its open position. For illustration purposes, the second door 112 is not shown in FIG. 6. In other embodiments (not shown), the second door 112 may also be movably connected to the body 104 (e.g. rather than being configured as removable hatch), in which case the second door 112 may be coupled to the body 104 using a similar hinge mechanism to the hinge mechanism 600.

The second end 603 of the hinge mechanism 600 (i.e. the end that is connected to the first door 110) includes a release mechanism 608 which is operable to release the first door 110 from the hinge mechanism 600 and therefore from the body 104. The release mechanism 608 is designed to be used in an emergency, to allow an occupant to exit the cockpit 106 when the first door 110 cannot be opened in a usual manner (e.g. using the door handles to open the first door 110 and moving it to the open position). For example, the occupant may be unable to open the first door 110 in the usual manner if the hinge mechanism 600 has become damaged, and/or if the first door is blocked by an external object. The release mechanism 608 comprises a handle 610 that protrudes from the inner surface 602 of the upper portion 122 of the first door 110, such that the handle 610 is accessible from inside the cockpit 106 when the first door 110 is closed. When the handle 610 is actuated, the release mechanism 608 disengages the first door 110 from the hinge mechanism 600, so that the first door 110 can be removed from the body 104. In this manner, an occupant of the cockpit 106 may actuate the handle 610 when the first door 110 is closed, in order to remove the first door 110 from the body 104 to enable them to exit the cockpit 106. In embodiments where the second door 112 is movably connected to the body 104, the second door 112 may also be provided with a similar release mechanism for releasing the second door 112 from the body (e.g. from its hinge mechanism).

Figures 7A, 7B:
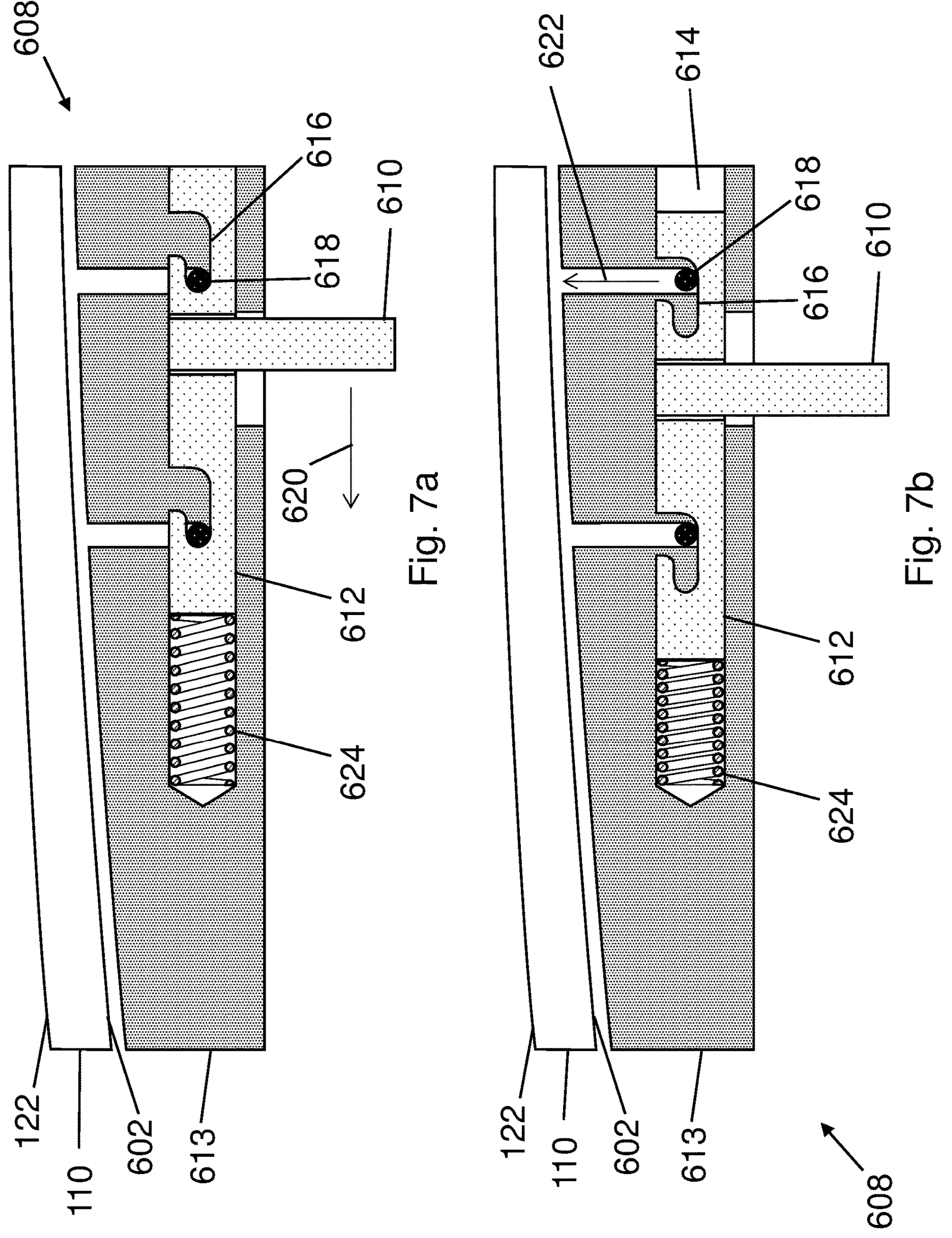
FIGS. 7*a* and 7*b* are schematic cross-sectional views of a release mechanism of the vehicle of FIG. 1.

The release mechanism 608 is illustrated in more detail in FIGS. 7*a* and 7*b*. FIGS. 7*a* and 7*b* show cross-sectional views of the release mechanism 608, the cross-sectional views corresponding to plane AA indicated in FIG. 6. FIG. 7*a* depicts the release mechanism 608 in a locked position, whilst FIG. 7*b* depicts the release mechanism 608 in a semi-released position. The release mechanism 608 comprises an elongate locking pin 612 which is movable (or slidable) along a cavity 614 formed in a housing 613 of the release mechanism 608, the locking pin 612 being movable along its longitudinal axis. The housing 613 of the release mechanism 608 is connected to the second end 603 of the hinge mechanism 600, and serves to connect the second end 603 of the hinge mechanism 600 to the inner surface 602 of the first door 110. The handle 610 is connected to the locking pin 612 via a slot formed in the housing 613, so that the handle 610 can be used to move the locking pin 612 along the cavity 614. The locking pin 612 includes a set of grooves (or channels) 616 formed therein which are engageable with corresponding engagement portions 618 of the first door 110. The engagement portions 618 may be in the form of elongate bars that are connected to the inner surface 602 of the first door 110, and that protrude from the inner surface 602 of the first door 110.

Each of the grooves 616 in the locking pin 612 includes a portion that extends along the longitudinal axis of the locking pin 612. When the locking pin 612 is in the locked position (FIG. 7*a*), the engagement portions 618 of the first door 110 are engaged in the grooves 616, such that the first door 110 is fastened to the housing 613 and thus to the second end 603 of the hinge mechanism 600. In particular, the grooves 616 are shaped such that, when the locking pin 612 is in the locked position, engagement of the engagement portions 618 in the grooves 616 prevents the first door 110 from being pushed away from the housing 613. When the locking pin 612 is moved to the released position by pushing the handle 610 (as indicated by arrow 620 in FIG. 7*a*), the engagement portions 618 of the first door 110 can be disengaged from the grooves 616 by pushing the first door 110 away from the housing 613, as shown by arrow 622 in FIG. 7*b*. Thus, when the locking pin 612 is in the released position, the first door 110 can be disengaged from the hinge mechanism 600, and therefore removed from the body 104.

A spring 624 is provided in the cavity 614, and arranged to bias the locking pin 612 towards the locked position. In this manner, the locking pin 612 may be retained in the locked position due to the spring 624, such that the first door 110 remains secured to the hinge mechanism 600. In order to release the first door 110 from the hinge mechanism 600, a user can push the handle 610 along the direction indicated by arrow 620 in FIG. 7*a*, in order to overcome the bias provided by the spring 624 and move the locking pin 612 from the locked position to the released position. Then, with the locking pin 612 in the released position, the user can push the first door 110 away from the housing 613, as indicated by arrow 622 in FIG. 7*b*, in order to remove the first door 110 from the body 104.

The handle 610 may be removably connectable to the locking pin 612. In this manner, the handle 610 may be stowed away during everyday use of the vehicle 100 (e.g. in a glove box of the vehicle 100). A user may then connect the handle 610 to the locking pin 612 when it is needed, in order to remove the first door 110 from the body 104. This may avoid the handle 610 constantly protruding within the cockpit 106 when the first door 110 is closed. The first door 110 may also include an opening formed in an outer surface of the first door 110, via which a person outside the cockpit 106 may engage a handle with the locking pin 612. This may enable the release mechanism 608 to be operated from outside the cockpit 106, so that an occupant of the cockpit can be rescued from outside.

Additionally or alternatively to providing the release mechanism 608 for removing the first door 110 from the body 104, the hinge mechanism 600 may be provided with an explosive charge (not shown). The explosive charge may be arranged to release the first door 110 from the hinge mechanism 600 when it is set off, e.g. by breaking part of hinge mechanism 600 and/or by breaking engagement between the second end 603 of the hinge mechanism 600 and the first door 110. Thus, in situations where the first door 110 cannot be opened in the usual manner, the explosive charge in the hinge mechanism 600 may be set off so that the first door 110 can be removed from the body 104 to allow an occupant of the cockpit 106 to exit. The vehicle 100 may comprise a button, handle, or other suitable interface arranged within the cockpit 106 for setting off the explosive charge. In some cases, the vehicle 100 may be configured to set off the explosive charge automatically under certain circumstances, e.g. if the vehicle 100 becomes inverted.

The invention claimed is:

1. A vehicle comprising:

a body;

a cockpit formed in said body, said cockpit having at last one seat disposed in a single file arrangement, wherein a maximum width of said cockpit accommodates a width of a singe one of the at least one seat, each seat of the at least one seat configured to receive a single occupant therein, wherein said body has a first door and a second door accessing said cockpit, the first door and the second door being respectively arranged on opposite sides of said cockpit, the opposite sides of said cockpit corresponding to a left-hand side and a right-hand side of said cockpit such that the left-hand side and the right-hand are defined with respect to the single occupant of the at least one seat, wherein an upper portion of the first door forms a first part of a roof of said cockpit when the first door is closed, the first part of the roof of the cockpit having an area larger than an area of any other part of the roof of said cockpit when the second door is closed.

2. The vehicle of claim 1, wherein an upper portion of the second door forms a second part of the roof of said cockpit when the second door is closed, wherein the second part of the roof of said cockpit is smaller than the first part of the roof of said cockpit.

3. The vehicle of claim 1, wherein the second door forms no part of the roof of said cockpit when the second door is closed.

4. The vehicle of claim 1, wherein the first door is larger than the second door.

5. The vehicle of claim 1, wherein the first part of the roof of said cockpit extends across a centerline of the vehicle.

6. The vehicle of claim 1, wherein said body has a fixed roof portion, a center of the fixed roof portion being laterally offset from a centerline of the vehicle.

7. The vehicle of claim 6, wherein the fixed roof portion is connected to a front pillar or a rear pillar of said body.

8. The vehicle of claim 6, wherein at least one of the first door and the second door is pivotable relative to the fixed roof portion between an open position and a closed position.

9. The vehicle of claim 1, wherein the first door and the second door are different door types.

10. The vehicle of claim 9, wherein the first door is a gull-wing door.

11. The vehicle of claim 1, wherein an upper portion of the first door has an aerodynamic element, the aerodynamic element being selected from the group consisting of a fin, an aerofoil, and at least one channel formed in a surface of the upper portion of the first door.

12. The vehicle of claim 1, wherein the maximum width of the cockpit is between 600 mm and 1600 mm, wherein a maximum width of the vehicle is between 1200 mm and 1600 mm.

13. The vehicle of claim 1, further comprising:

a hinge coupling the first door to said body, said hinge being an explosive charge.

14. The vehicle of claim 1, further comprising:

a first mechanical coupling movably connecting the first door to said body;

a first release mechanism cooperative with said first mechanical coupling so as to undo said first mechanical coupling such that the first door is removable from said body;

a second mechanical coupling movably connecting the second door to said body; and a second release mechanism cooperative with said second mechanical coupling so as to undo said second mechanical coupling such that the second door is removable from said body.

15. The vehicle of claim 1, wherein the first door has a first portion and a second portion, the second portion being pivotable relative to the first portion when the first door is opened.

16. The vehicle of claim 1, wherein said body has a step, the first door at least partially covering the step when the first door is closed.

17. The vehicle of claim 1, wherein the first door has a side impact structure.

18. The vehicle of claim 1, wherein the first door has an airbag therein.

19. The vehicle of claim 1, wherein the at least one seat is a single seat.

20. The vehicle of claim 1, wherein the at least one seat is a first seat and a second seat located behind the first seat.

* * * * *